United States Patent Office

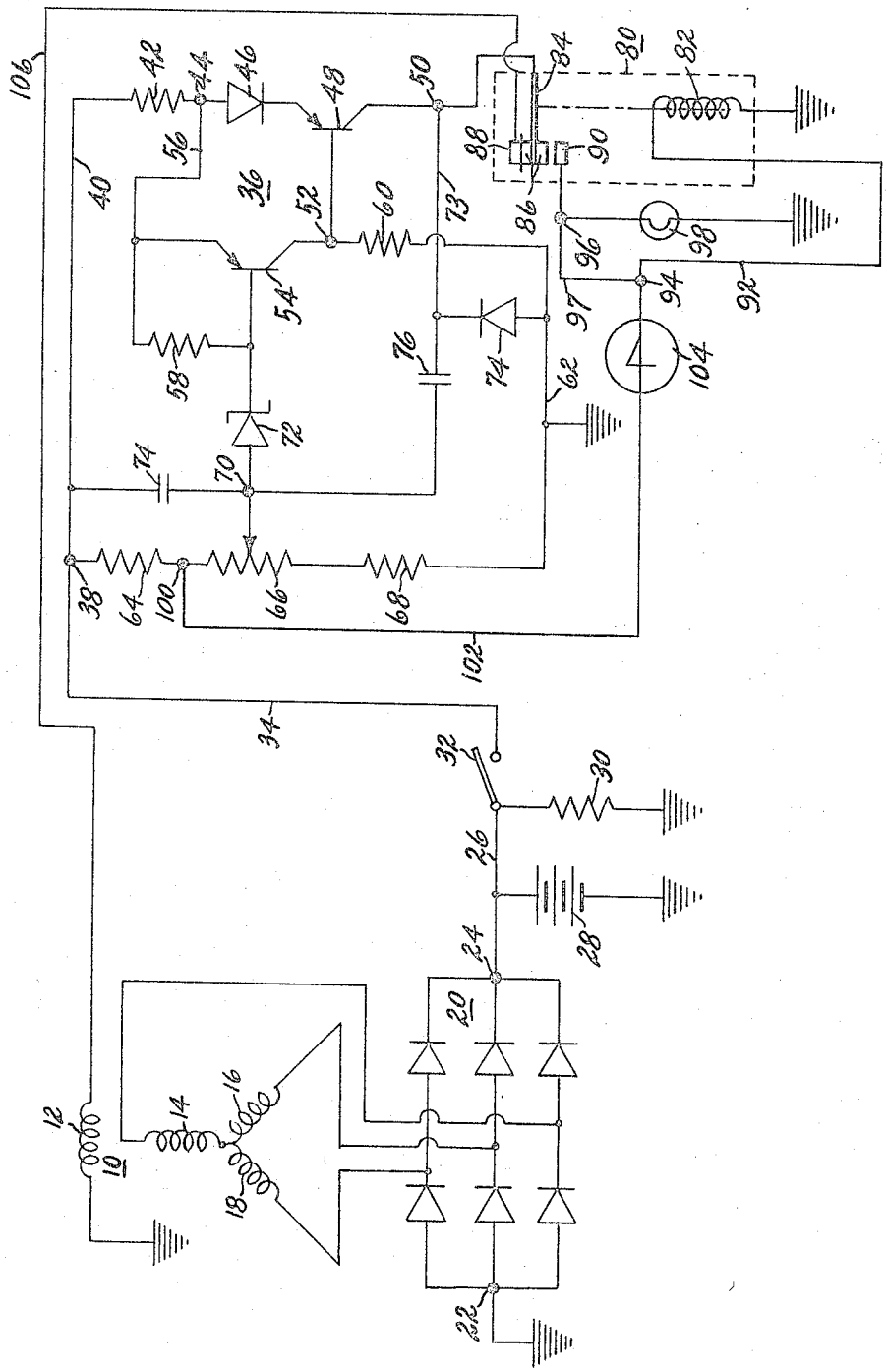

3,332,006
Patented July 18, 1967

3,332,006
MALFUNCTION INDICATOR AND PROTECTIVE SYSTEM FOR SEMICONDUCTOR VOLTAGE REGULATOR
William D. Worrell and Thomas E. Kirk, Anderson, Ind., assignors to General Motors Corporation, Detroit, Mich., a corporation of Delaware
Filed June 27, 1963, Ser. No. 291,124
4 Claims. (Cl. 322—75)

This invention relates to an electrical system and more particularly to an electrical system that is provided with means for indicating an overvoltage condition and for eliminating the overvoltage condition when it occurs.

In motor vehicle electrical systems, it is common practice to provide a voltage regulator which maintains the output voltage of a generator at a substantially constant value. The output voltage of the generator is used to feed the electrical loads on a motor vehicle and is used to charge the storage battery on a motor vehicle. In the past, it has been common practice to use vibrating contact regulators for controlling the energization of the field of the generator and more recently, transistor voltage regulators have been used to control the field current of the generator.

The present invention is concerned with means for indicating a condition where the output voltage of the generator rises to some abnormal value and to a system for eliminating this condition when it occurs.

It accordingly is an object of this invention to provide an electrical indicating system for a power supply system that will indicate a dangerous overvoltage condition.

Another object of this invention is to provide an electrical system for a motor vehicle wherein means are provided for indicating a condition where the output voltage of the generator rises to some abnormally high value which is above the desired regulated output voltage to be maintained by a voltage regulator.

A further object of this invention is to provide an overvoltage indicating system for an electrical supply system that includes a semiconductor four layer diode connected with an electrically energizable indicating device such as a signal lamp.

Still another object of this invention is to provide an electrical system which is capable of indicating the over voltage condition of a power source such as a generator and then eliminating this condition by opening the field circuit of the generator and maintaining this field circuit open once an abnormally high voltage condition has occurred.

Further objects and advantages of the present invention will be apparent from the following description, reference being had to the accompanying drawing wherein preferred embodiments of the present invention are clearly shown.

In the drawing:

The figure is a schematic circuit diagram of an electrical system which is capable of indicating a high voltage condition and then opening the circuit to the field winding of the generator when this high voltage condition occurs.

Referring now to the drawing and more particularly to the figure the reference numeral 10 generally designates an alternating current generator which has a field winding 12 and a three phase Y-connected output winding comprised of phase windings 14, 16 and 18. The output winding is connected with the input terminals of a three phase full wave bridge rectifier network generally designated by reference numeral 20 and comprised of six semiconductor silicon diodes. The anodes of three diodes are connected to junction 22 which is grounded. The cathodes of the other three diodes are connected with junction 24. The junctions 24 and 22 provide positive and negative DC output terminals for the bridge rectifier network 20.

The generator 10, in a motor vehicle electrical system, is driven by the engine and one of the windings is rotatable with respect to the other winding. The diodes that form the bridge rectifier network can be built into the generator if desired or can be a separate unit. It will be appreciated by those skilled in the art that the output voltage of the generator 10 depends upon the amount of field current supplied to the field winding 12 and that the DC output voltage appearing between junctions 24 and 22 varies in accordance with the output voltage of the three phase output winding.

The DC output terminal 24 is connected with a conductor 26 which feeds the storage battery 28 and an electrical load designated by reference numeral 30. The conductor 26 is connected to one side of a manually operable switch 32 the opposite side of this switch being connected with conductor 34.

The electrical system of this invention is provided with a semiconductor voltage regulator generally designated by reference numeral 36 which in this case is a transistor regulator. The regulator 36 has a positive input terminal 38 connected with conductors 34 and 40. The conductor 40 is connected with a resistor 42 the opposite side of this resistor being connected with junction 44. A diode 46 is connected between junction 44 and the emitter electrode of a PNP junction transistor 48. The collector electrode of transistor 48 is connected with junction 50 while the base electrode of this transistor is connected with a junction 52.

The transistor regulator has another PNP junction transistor designated by reference numeral 54. The emitter of transistor 54 is connected with junction 44 via conductor 56. The collector of transistor 54 is connected with junction 52. A resistor 58 connects the emitter and base electrodes of transistor 54. A resistor 60 connects the junction 52 with a grounded conductor 62.

The voltage sensing circuit for the transistor regulator is comprised of a resistor 64, a potentiometer resistor 66 and a resistor 68. This voltage dividing network is connected between junction 38 and the grounded conductor 62 as is clearly apparent from the figure. The shiftable tap of the potentiometer resistor 66 is connected with junction 70 and it is seen that a Zener diode 72 is connected between junction 70 and the base electrode of transistor 54. A filter capacitor 74 is connected between junction 70 and conductor 40. A feedback capacitor 76 connects the collector electrode of transistor 48 with the junction 70. A transient voltage suppressing diode 74 is connected between conductors 73 and 62.

The transistor regulator is of a type shown in the Hetzler Patent, 2,945,174, and operates to cause the transistor 48 to switch on and off in its emitter-collector circuit in accordance with the output voltage of the bridge rectifier 20. In this circuit, the conduction of transistor 54 is controlled by the Zener diode 72 and this diode is connected in a circuit which senses the voltage appearing across the voltage divider 64, 66 and 68. The other elements of the circuit and their function is more fully described in the Hetzler patent, 2,945,174, it being sufficient for this application to point out that the transistor 48 controls the amount of current flowing through the field winding 12 in accordance with the output voltage conditions of the bridge rectifier 20.

The electrical system of this invention has a protective and indicating relay which is generally designated by reference numeral 80. The relay 80 has an actuating coil 82 and an armature 84 carrying a movable contact 86. The movable contact 86 is normally biased to engage fixed contact 88 as shown in the figure by a spring or other means. When the relay coil 82 is energized, the contact 86 will move out of engagement with contact 88 and the contact 86 will move into engagement with the fixed contact 90.

The relay actuating coil 82 has one side thereof connected with a conductor 92 which is connected with junction 94. The junction 94 is connected with fixed relay contact 90 by a conductor 97. A signal lamp 98 is connected between junction 96 and ground. It is seen that one side of the relay coil 82 is grounded.

The conductor 92 is connected to one side of a semiconductor voltage responsive circuit element 104. The element 104 is a PNPN four layer diode. The characteristics of this element are such that no current will flow through the element when a voltage is applied across the element up to a certain predetermined breakdown voltage. After this breakdown voltage is reached and exceeded, the four layer diode will break down and become conductive. It is seen that the opposite side of the four layer diode 104 is connected with conductor 102 and that this four layer diode will control the current flow through the relay coil 82. The fixed relay contact 88 is connected with a conductor 106 which is also connected to one side of the field winding 12 of the generator 10. The opposite side of the field winding 12 is grounded as shown.

When the manually operable switch 32 is closed, the electrical system of the figure is energized. When the engine of the motor vehicle is not driving the generator 10, the field 12 is initially energized from the battery 28 through conductor 26, the closed switch 32, conductor 34, junction 38, conductor 40, resistor 42, junction 44, diode 46, the emitter-collector circuit of transistor 48, junction 50, closed contacts 88 and 86, the conductor 106 and then through the field winding 12 to ground. When the generator is driven, it develops an output voltage and a DC output voltage therefore appears between the junctions 24 and 22. This DC output voltage is applied to the voltage divider network of the transistor regulator 36 and controls the conduction or nonconduction of the transistor 48. When the voltage is too high, the transistor 48 is switched off to reduce field current and when the voltage is too low, the transistor 48 becomes conductive to increase field current. In this manner, the output voltage of the generator 10 is regulated in accordance with the DC output voltage of the bridge rectifier 20.

If there is some malfunction in the electrical system such as a shorted transistor 48 which provides continuous energization for the field winding 12, the output voltage appearing between junctions 24 and 22 will rise to some abnormal value above the desired regulated value. The voltage break down rating of the four layer diode 104 is so selected that under this abnormally high voltage condition, the potential appearing between junction 100 and ground is such that the four layer diode will break down causing a current to flow through the relay coil 82. When relay coil 82 is energized, contact 86 moves away from contact 88 to open the field circuit and therefore cut off the output voltage of the generator 10. In addition, the energization of relay coil 82 causes the contact 86 to move into engagement with fixed contact 90 which provides a holding circuit for the actuating coil 82 from conductor 40, resistor 42, diode 46, transistor 48, closed contacts 86 and 90, conductor 97, conductor 92 and through coil 82 to ground. As a result, the field circuit of the generator is maintained in an open condition once the abnormally high voltage condition is sensed. When this abnormally high voltage condition is sensed and the four layer diode 104 breaks down, the signal lamp 98 will be energized from junction 96 and closed contacts 86 and 90 to indicate that there is a malfunction in the system.

It can be seen from the foregoing that the electrical system of this invention will open the field circuit of the generator 10 when the output voltage appearing between junctions 24 and 22 is abnormally high and above the voltage maintained by the voltage regulator 36. In addition when this condition occurs, the field circuit will be maintained open until the switch 32 is opened. Moreover this abnormally high voltage condition is indicated by the lighting of the signal lamp 98.

While the embodiments of the present invention as herein disclosed, constitute a preferred form, it is to be understood that other forms might be adopted.

What is claimed is as follows:

1. In combination, a generator having an output winding and a field winding, a direct current output circuit connected to said output winding to be energized thereby, the output voltage of said generator being a function of the amount of field current supplied to said field winding, a voltage regulating means, said voltage regulating means including voltage sensing means connected with said direct current output circuit for sensing the voltage across said output circuit and including means connected in series with said field winding and across said direct current output circuit for controlling the current supplied to said field winding from said output circuit as a function of the voltage appearing across said output circuit, and a protective switching device connected in series with said field winding for connecting and disconnecting said field winding and voltage regulator to and from said direct current output circuit, said switching device including high voltage responsive means for sensing the voltage appearing across said direct current output circuit, said voltage responsive means being operative to cause said switching means to disconnect said field winding from said direct current output circuit when the voltage appearing across said direct current output circuit exceeds the voltage to be maintained by said voltage regulating means by a predetermined amount, a battery connected across said direct current output circuit to be charged by said generator, and means connecting said battery with said switching device, said switching device including means energized by said battery for maintaining said field winding and output circuit disconnected once said high voltage condition is sensed and following an initial disconnection of said field winding and a consequent reduction in output voltage of said generator.

2. In combination, a generator having an output winding and a field winding, said output winding of said generator connected with a direct current output circuit and applying a direct current voltage to said output circuit, a voltage regulating means including a transistor, said voltage regulating means including sensing means connected with said output circuit and with said transistor for controlling the conduction of said transistor as a function of the voltage appearing across said output circuit, a field circuit for said field winding connected across said output circuit and including in a series connection said transistor and said field winding, said voltage regulating means being operative to maintain the voltage across said output circuit at substantially a first predetermined level, a high voltage responsive switch means connected with said output circuit for sensing the voltage of said output circuit, said voltage responsive switch means including a switching device connected in series in said field circuit for opening and closing said field circuit, said voltage responsive switching means operative to open said field circuit when the voltage appearing across said output circuit reaches a second predetermined level which is higher than said first predetermined level by a predetermined amount and operative to normally maintain said field circuit closed when the voltage regulating means maintains the output voltage of the generator at substantially said first predetermined level, said voltage responsive switching means including control means for maintaining said switching device in an open condition when the voltage across said output circuit has reached said second predetermined value, and a battery connected with said output circuit, said control means being connected with said battery whereby said control means is energized by said battery when said field circuit is initially opened during a high voltage condition to reduce the output voltage of the generator substantially to zero.

3. In combination, an alternating current generator having an output winding and a field winding, rectifier means connected between said output winding and a direct current output circuit, a voltage regulating means including a transistor and a voltage sensing circuit, said voltage sensing circuit being connected with said output circuit and with said transistor for varying the conduction of said transistor as a function of the voltage appearing across said output circuit, means connecting said transistor and said field winding in series across said output circuit, and a protective high voltage responsive switching means including a switching device connected in series with said transistor and field winding and including means for sensing the voltage appearing across said output circuit, said voltage regulating means maintaining the voltage across said output circuit at substantially a first predetermined level, said voltage responsive switching means being operative to disconnect said field winding and transistor from said output circuit in response to the voltage appearing across said output circuit reaching a second predetermined level which is higher than said first predetermined level, a battery connected across said output circuit to be charged by said rectifier means, and means connected with and energized by said battery for maintaining said voltage responsive switching means in an open condition once it is shifted to an open condition by a voltage appearing across said output circuit that reaches said second predetermined level.

4. In combination, a generator having an output winding and a field winding, a direct current output circuit connected with said output winding, a voltage regulating means, a field circuit connected across said output circuit including in a series connection said field winding and said voltage regulating means, said voltage regulating means including means for sensing the voltage appearing across said output circuit and for varying the current supplied to said field winding as a function of said voltage, said voltage regulating means maintaining a substantially constant voltage of a first predetermined level across said output circuit, a protective high voltage responsive switching means connected with said output circuit to respond to the voltage appearing across said output circuit, said voltage responsive switching means including a switching device connected in series in said field circuit and operative to open said field circuit when the voltage appearing across said output circuit reaches a second predetermined level which is higher than said first predetermined level, a battery connected with said output winding of said generator to be charged thereby, a holding means connected with said battery for maintaining said switching device in an open condition once the voltage across said output circuit reaches said second predetermined level, and a signal lamp energized from said battery through said voltage responsive switching means when said voltage responsive switching means opens said field circuit.

References Cited

UNITED STATES PATENTS

| | | | |
|---|---|---|---|
| 3,022,456 | 2/1962 | Larson et al. | 322—28 |
| 3,049,632 | 8/1962 | Staples. | |
| 3,082,370 | 3/1963 | Halliday | 322—73 X |
| 3,086,161 | 4/1963 | DeCarbo et al. | 322—28 X |
| 3,106,673 | 10/1963 | Domann | 322—73 |
| 3,133,204 | 5/1964 | Winchel | 307—88.5 |
| 3,214,599 | 10/1965 | Wellford | 322—73 X |

MILTON O. HIRSHFIELD, *Primary Examiner.*

J. J. SWARTZ, J. W. GIBBS, *Assistant Examiners.*